(12) United States Patent
Quinlan et al.

(10) Patent No.: US 10,701,867 B2
(45) Date of Patent: Jul. 7, 2020

(54) HORTICULTURAL CONTAINER WITH TAG SLOT

(71) Applicant: THE HC COMPANIES, INC., Twinsburg, OH (US)

(72) Inventors: Robert Quinlan, Stow, OH (US); Doug Pettigrew, Wilsonville (CA)

(73) Assignee: THE HC COMPANIES, INC., Twinsburg, OH (US)

( * ) Notice: Subject to any disclaimer, the term of this patent is extended or adjusted under 35 U.S.C. 154(b) by 182 days.

(21) Appl. No.: 15/906,284

(22) Filed: Feb. 27, 2018

(65) Prior Publication Data

US 2018/0242533 A1 Aug. 30, 2018

Related U.S. Application Data

(60) Provisional application No. 62/464,146, filed on Feb. 27, 2017, provisional application No. 62/532,685, filed on Jul. 14, 2017.

(51) Int. Cl.
*A01G 9/00* (2018.01)
*A01G 9/02* (2018.01)

(52) U.S. Cl.
CPC .............. *A01G 9/006* (2013.01); *A01G 9/02* (2013.01); *A01G 9/021* (2013.01)

(58) Field of Classification Search
CPC .......... A01G 9/045; A01G 9/02; A01G 9/006; A01G 9/029
See application file for complete search history.

(56) References Cited

U.S. PATENT DOCUMENTS

| 2003/0167688 A1* | 9/2003 | Atchley | A01G 9/029 47/73 |
| 2016/0165806 A1* | 6/2016 | Ying | A01G 9/006 47/66.6 |
| 2018/0007840 A1* | 1/2018 | Quinlan | A01G 9/006 |

\* cited by examiner

*Primary Examiner* — Monica L Williams
(74) *Attorney, Agent, or Firm* — Tucker Ellis LLP

(57) ABSTRACT

A horticultural container includes a tag slot for receiving a display tag. The tag slot has an inner wall and an outer wall spaced widthwise from one another, and one of the inner or outer walls has at least two curved peaks separated by a valley and extending into the slot towards the other of the inner or outer wall to hold the tag against the other of the inner or outer wall. The peaks provide a radius that reduces cracking of the tag and increases longevity thereof, and reduces tag sagging, collapsing, or curling.

20 Claims, 18 Drawing Sheets

HORTICULTURAL CONTAINER WITH TAG SLOT

RELATED APPLICATIONS

This application claims the benefit of U.S. Provisional Application No. 62/464,146 filed Feb. 27, 2017 and U.S. Provisional Application No. 62/532,685 filed Jul. 14, 2017, which are hereby incorporated herein by reference.

FIELD OF INVENTION

The present invention relates generally to horticultural containers, and more particularly to horticultural containers with tag slots.

BACKGROUND

Plants are often sold in pre-planted arrangements in horticultural containers, such as planters and hanging baskets. In many situations, plants are raised from seed in the containers or the containers hold young plants. These, and other types of plants, may be sensitive to excessively damp growing medium (e.g., soil). Therefore, drainage from the container should be considered for the combination of growing medium and plant type. One drainage factor contributing to plant health is speed of drainage. Another factor contributing to plant health may be aeration of the growing medium.

Other considerations for horticultural containers include the ability to identify the type of plant(s) in the container, care or growing instructions, price and so forth. For some planters and hanging baskets, the identification of the type or types of plants in the container, as well as care or growing instructions, may be printed on a tag that is hung from a slot in the container. The slot may be present in an upper rim of the container and a portion of the tag is inserted upwardly or downwardly through the slot such that the main body of the tag with the printed information hangs adjacent the sidewall of the container or above the upper rim.

The tags may be made from plastic sheet material or paper that has been laminated with a thin layer of plastic or coated with wax. The tags may be thin and flexible and/or subject to curling, especially after being exposed to water and/or sunlight. For tags inserted downwardly through the slot such that the main body of the tag with the printed information is located above the upper rim, the tags may have a tendency to collapse, curl or sag downward.

SUMMARY OF INVENTION

The present application provides a horticultural container having a tag slot for receiving a display tag. The tag slot has an inner wall and an outer wall spaced widthwise from one another, and one of the inner or outer walls has at least two curved peaks separated by a valley and extending into the slot towards the other of the inner or outer wall to hold the tag against the other of the inner or outer wall. The peaks provide a radius that reduces cracking of the tag and increases longevity thereof, and reduces tag sagging, collapsing, or curling.

According to an aspect, a horticultural container is provided that comprises a body defining a chamber, a base extending from a bottom of the body to form with the body a closed end of the chamber, and an upper rim extending from a top of the body, the upper rim having a tag slot defining a through passage for receiving a tag, wherein the tag slot has an inner wall and an outer wall spaced widthwise from one another, and wherein one of the inner or outer walls has at least two curved peaks separated by a valley and extending into the slot towards the other of the inner or outer wall to hold the tag therebetween.

The tag slot may include a pair of ledges configured to be contacted by the tag to prevent downward movement of the tag once installed.

The ledges may extend from side walls of the slot such that a length of the slot at a top of the slot is greater than a length of the slot at a bottom of the slot.

Adjacent each ledge is a projection extending from each side wall, and wherein the projections define respective cavities at an underside of the upper rim and define with the respective ledge respective pockets for the tag.

The body may include four sides, and where each side has a planar portion and a recessed portion that is recessed inward out of a plane of the planar portion.

The base may include at least one projection extending downwardly from the base to contact a surface upon which the container is configured to rest and defining a first opening to allow soil in the chamber to contact the surface for wicking through the first opening, and at least one second opening spaced above the first opening to allow for drainage from the chamber.

The body may include at least one third opening at a bottom of the body proximate the base, and wherein the at least one third opening is spaced above the at least one second opening to allow for drainage at an elevation higher than the at least one second opening.

The at least one third opening may include a plurality of vertical slots spaced around the body and at the same elevation as one another.

The base may include at least one fourth opening spaced above the at least one second opening and below the at least one third opening.

The container may further include a plurality of legs configured to contact the surface and space the base from the surface to allow air flow under the container, wherein the plurality of legs are flush with the at least one projection.

The tag slot may have a first length at a top of the tag slot and a second length at the bottom of the tag slot that is less than the first length.

The tag that may have a body, a neck extending from shoulders on the body, and a head extending from the neck and having a pair of ears on opposite sides thereof, wherein a width of the tag at the ears is greater than the second length and a width of the tag at the body is less than the first length.

When the tag is installed in a standing position, the shoulders of the tag may be disposed in the tag slot proximate a top of the ledges and the ears of the tag are disposed outside the tag slot proximate a bottom of the ledges, and when the tag is installed in a hanging position, the ears of the tag are disposed in the tag slot proximate the top of the ledges and the shoulders of the tag are disposed outside the tag slot proximate the bottom of the ledges.

According to another aspect, a horticultural container configured to rest on a surface is provided. The horticultural container comprises a body defining a chamber, and a base extending from a bottom of the body to form with the body a closed end of the chamber, the base including at least one projection extending downwardly from the base to contact the surface and defining a first opening to allow soil in the chamber to contact the surface for wicking through the first opening, and at least one second opening spaced above the first opening to allow for drainage from the chamber.

The body may include at least one third opening at a bottom of the body proximate the base, and wherein the at least one third opening is spaced above the at least one second opening to allow for drainage at an elevation higher than the at least one second opening.

The at least one third opening may include a plurality of vertical slots spaced around the body and at the same elevation as one another.

The base may include at least one fourth opening spaced above the at least one second opening and below the at least one third opening.

The horticultural container may additionally include a plurality of legs configured to contact the surface and space the base from the surface to allow air flow under the container, wherein the plurality of legs are flush with the at least one projection.

According to still another aspect, a horticultural container is provided that includes a body defining a chamber, a base extending from a bottom of the body to form with the body a closed end of the chamber, and an upper rim extending from a top of the body, the upper rim having a tag slot extending therethrough for receiving a tag, wherein the tag slot has an inner wall and an outer wall spaced widthwise from one another, and wherein one of the inner or outer walls has a curved portion extending into the slot towards the other of the inner or outer wall creating an area between the inner and outer walls having a reduced width from another area between the inner and outer walls.

The curved portion may include first and second curved portions spaced lengthwise from one another.

The foregoing and other features of the application are described below with reference to the drawings.

DETAILED DESCRIPTION

Figure 1:
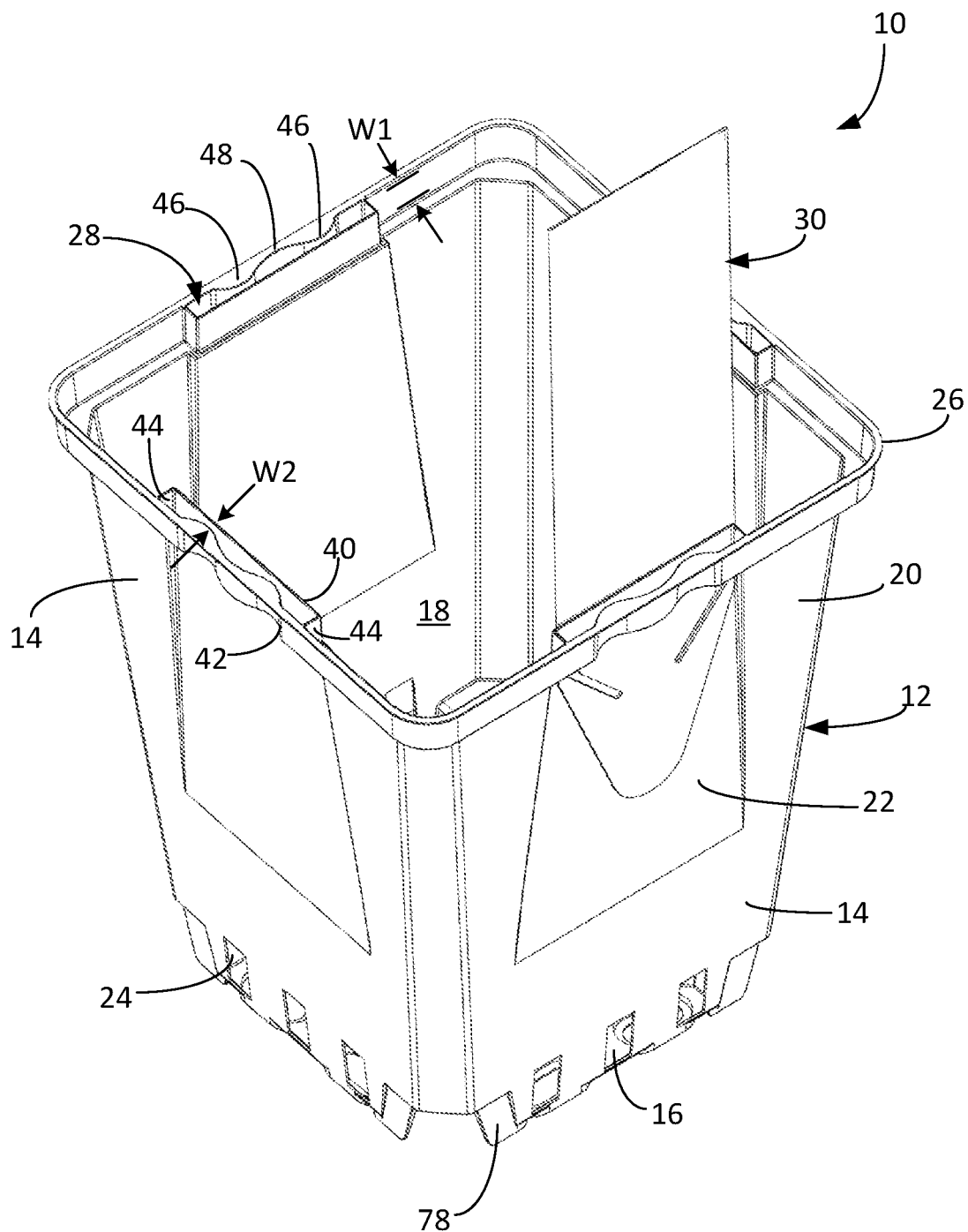
FIG. 1 is a perspective view of an exemplary horticultural container with a tag received in a tag slot.
Figure 2:
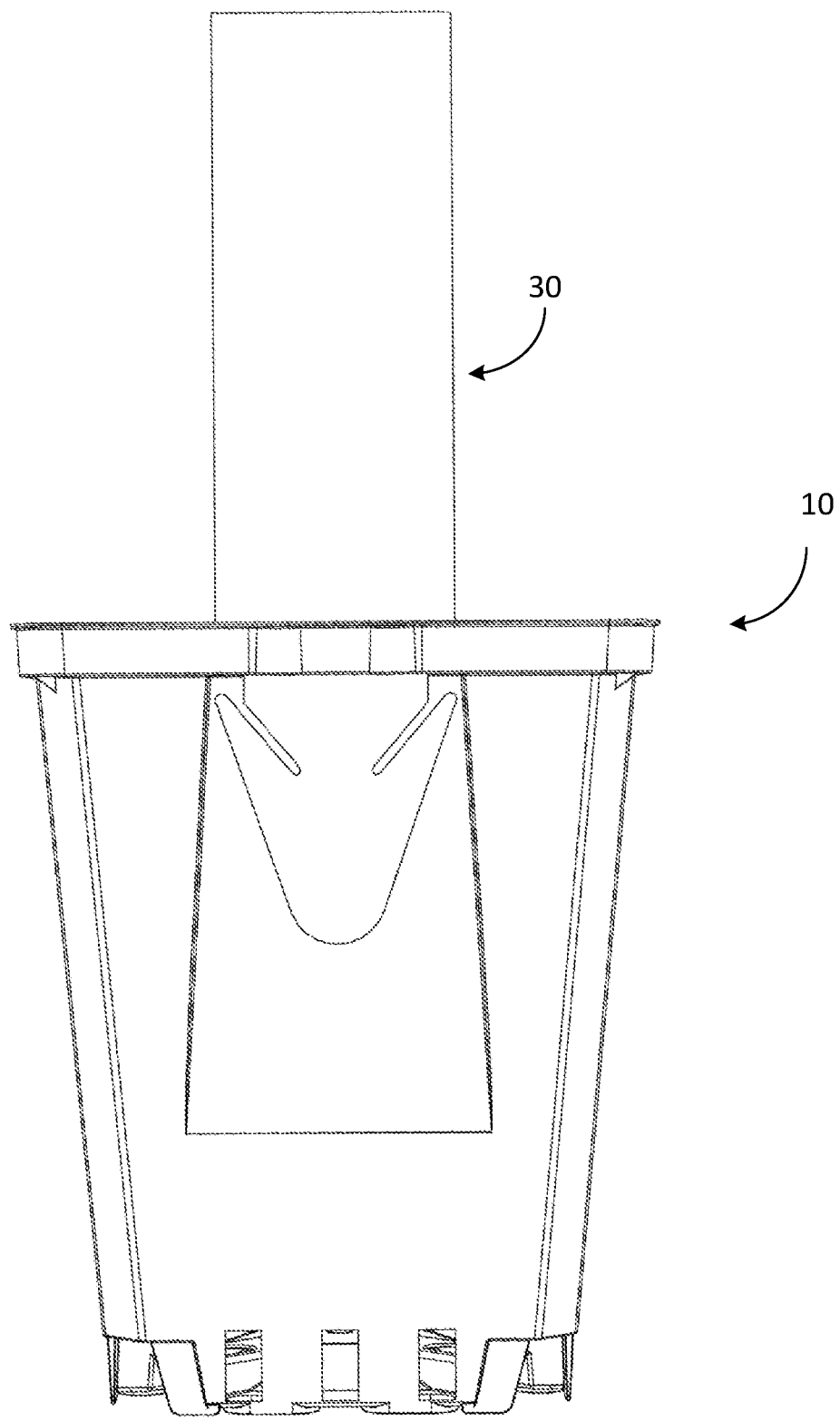
FIG. 2 is a front view of the horticultural container with tag.
Figure 3:
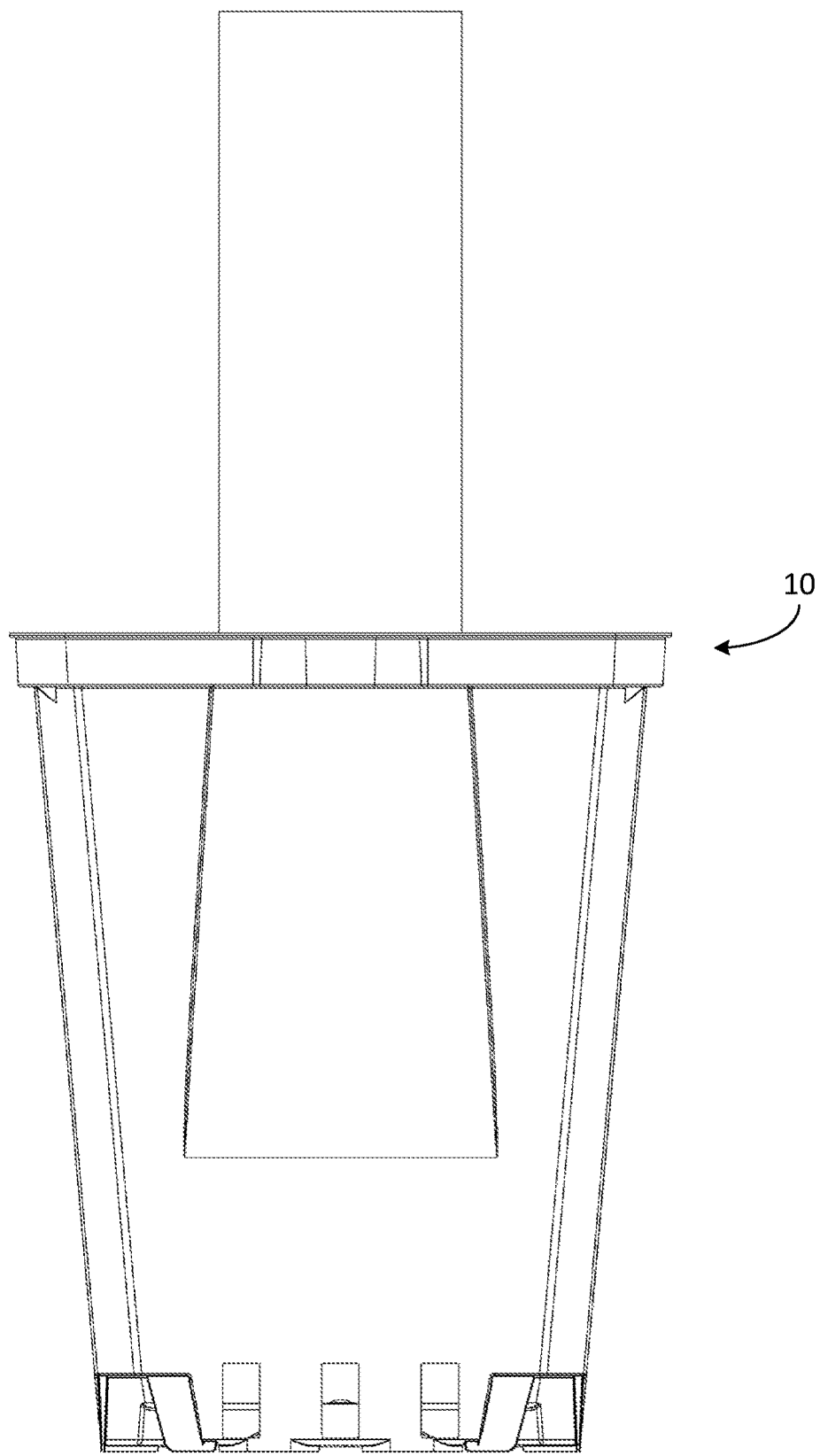
FIG. 3 is a rear view of the horticultural container with tag.
Figure 4:
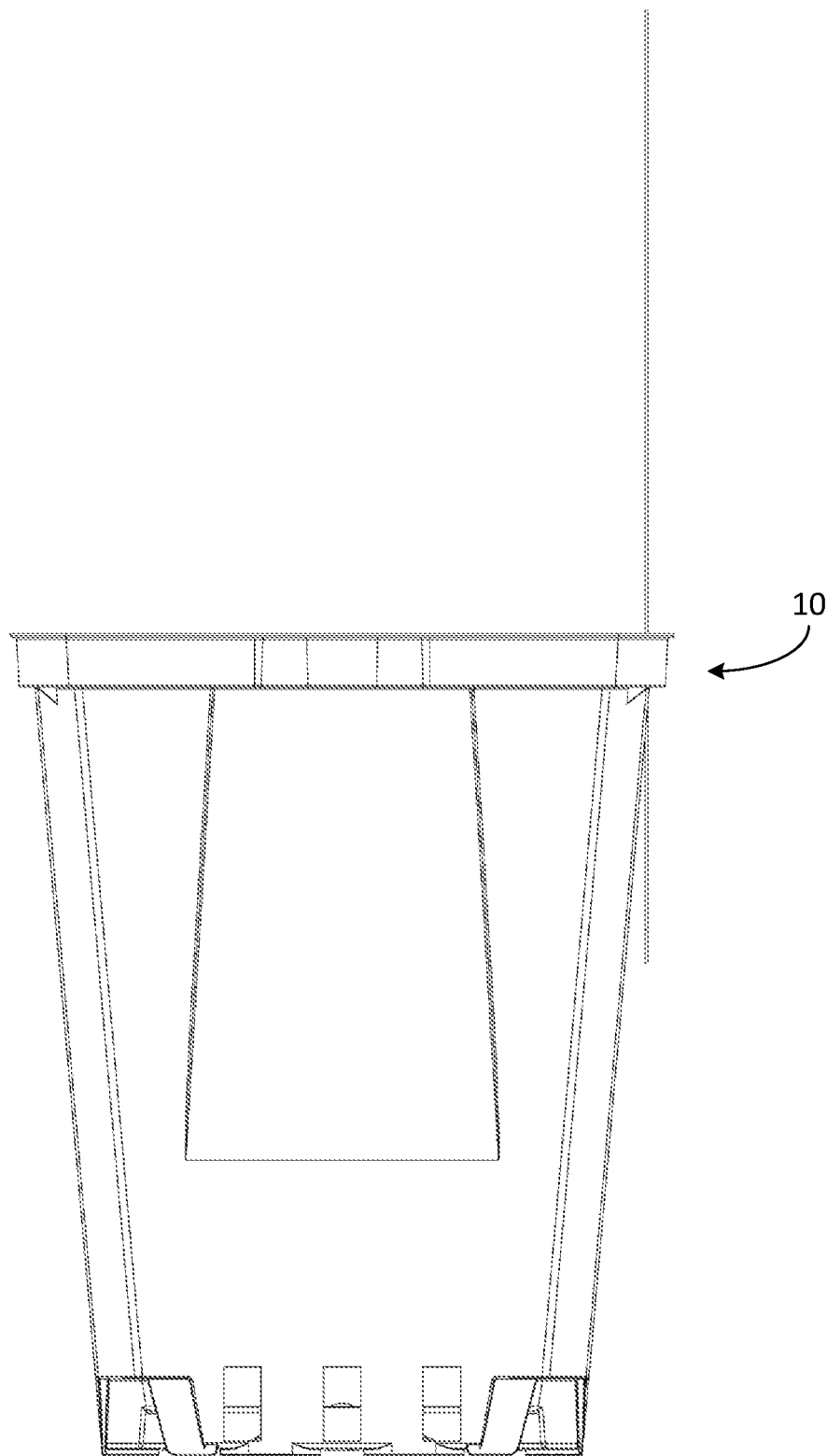
FIG. 4 is a left side view of the horticultural container with tag.
Figure 5:
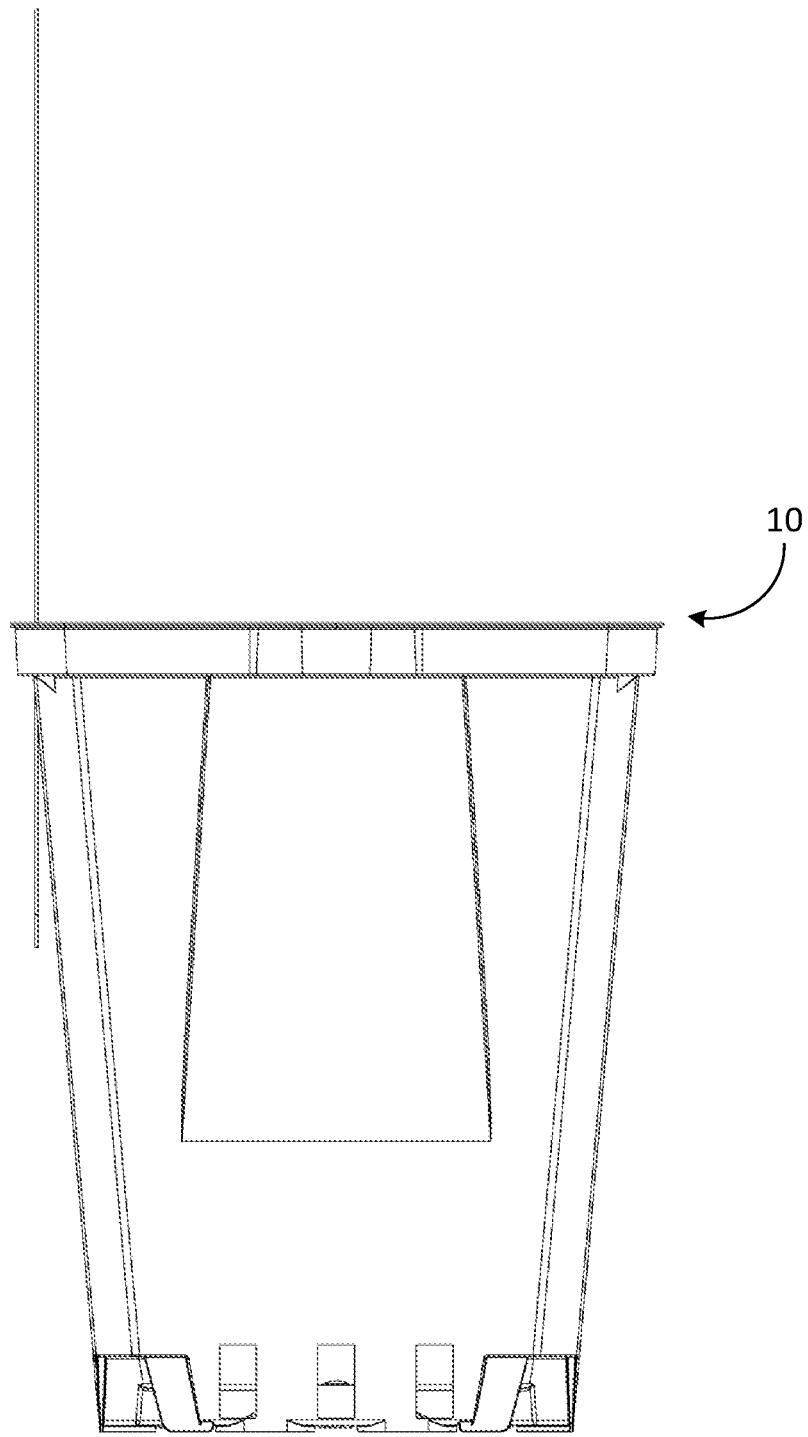
FIG. 5 is a right side view of the horticultural container with tag.

Turning initially to FIG. 1, an exemplary horticultural container is shown at reference numerals 10. The horticultural container 10 includes a body 12 that is illustrated as a container having four sides 14 and being generally square in overall shape, and a base 16 extending from a bottom of the sides 14 to form with the sides a closed end of a chamber 18. To facilitate nesting and stacking of multiple containers, the sides 14 may taper from top to bottom. Each side has a planar portion 20, a recessed portion 22 that is recessed inward out of the plane of the planar portion 20, and at least one opening 24 at a bottom of the side 14 proximate the base 16. The at least one opening 24, and as illustrated three openings 24 spaced along the plane of each side 14, are shown as vertical slots having respective lower ends that start near the bottom of the sides 14 and extend upward a desired distance. During molding, protrusions on a mold core contact a side wall of a mold cavity to center the core to eliminate or reduce the chance of an incomplete mold, and the injected material flows around the protrusions creating the openings 24. The openings 24 thus allow for a manufacturing advantage and also allow for improved drainage, aeration and for reduced material usage.

An upper rim 26 extends from a top of the body 12, and in particular from a top of each side 14 circumscribing the body 12. The upper rim 26 includes at least one tag slot 28 extending therethrough for receiving a tag 30, and in the illustrated embodiment a tag slot 28 on each side 14 of the body 12. The tag slots 28 may be formed during molding of the container 10, which may be made from plastic material by, for example, injection molding, and fewer than all sides 14 of the container may include a tag slot.

The tag slots 28 include elongate slit-like features that form through passages in the upper rim 26 and that extend along the plane of the corresponding side 14. Each tag slot 28 has an inner portion or wall 40, an outer portion or wall 42 that may be formed by a portion of the upper rim 26, and a pair of side portions or walls 44 connecting the inner and outer walls to form a substantially rectangular slot. One of the inner wall 40 or outer wall 42, and in the illustrated embodiment the outer wall 42, has at least two curved peaks 46 separated by a valley 48, otherwise referred to as a double wave, extending widthwise into the slot 28 to impart a curve to the tag 30. By curving the peaks 46, a radius is created that reduces cracking of the tag slot and increases longevity thereof, and a guide is provided for a pointed end of the tag to center the tag in the tag slot. The curved peaks 46 extend widthwise into the slot perpendicular to the plane of each side 14 to reduce the width of the slot at discrete locations to hold the tag 30 against the inner wall 40 to apply pressure to the tag to hold the tag in an upright position to reduce the chance of sagging, collapsing, and/or curling. For example, each tag slot 28 has a first width W1 between the inner and outer walls 40 and 42 proximate the side walls 44, and a second width W2 less than the first width W1 between the inner and outer walls 40 and 42 at each of the peaks 46.

Figure 6:
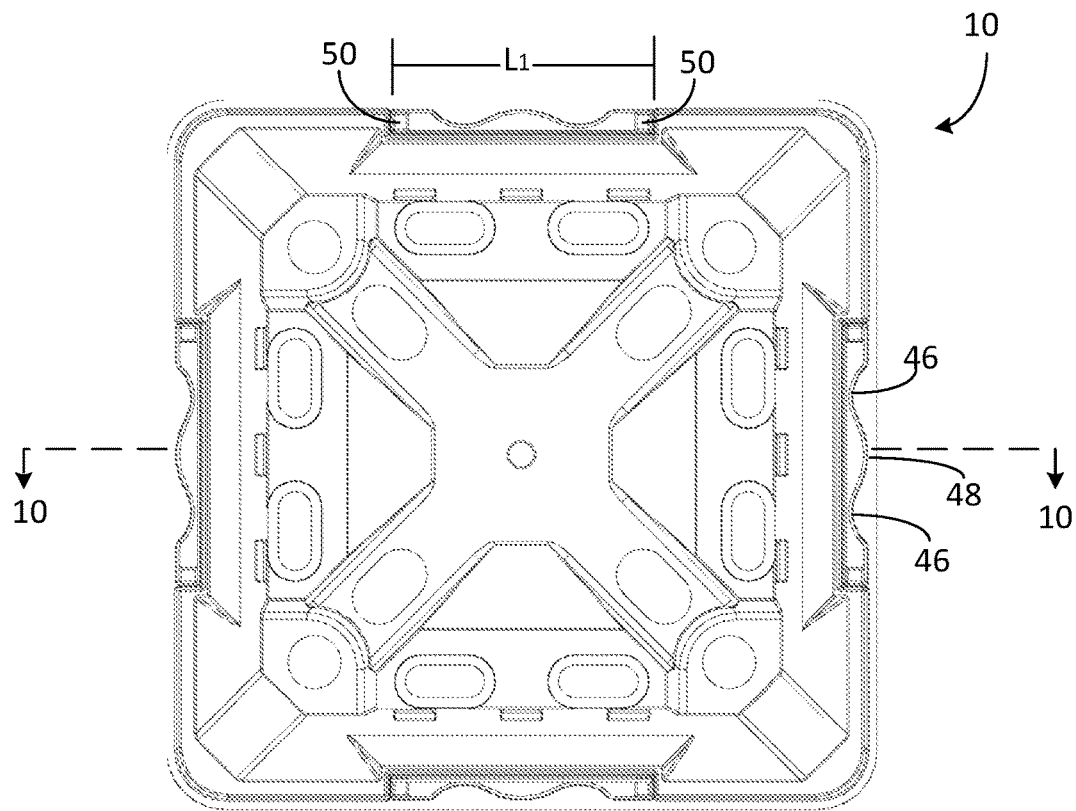
FIG. 6 is a top view of the horticultural container with tag.
Figure 7:
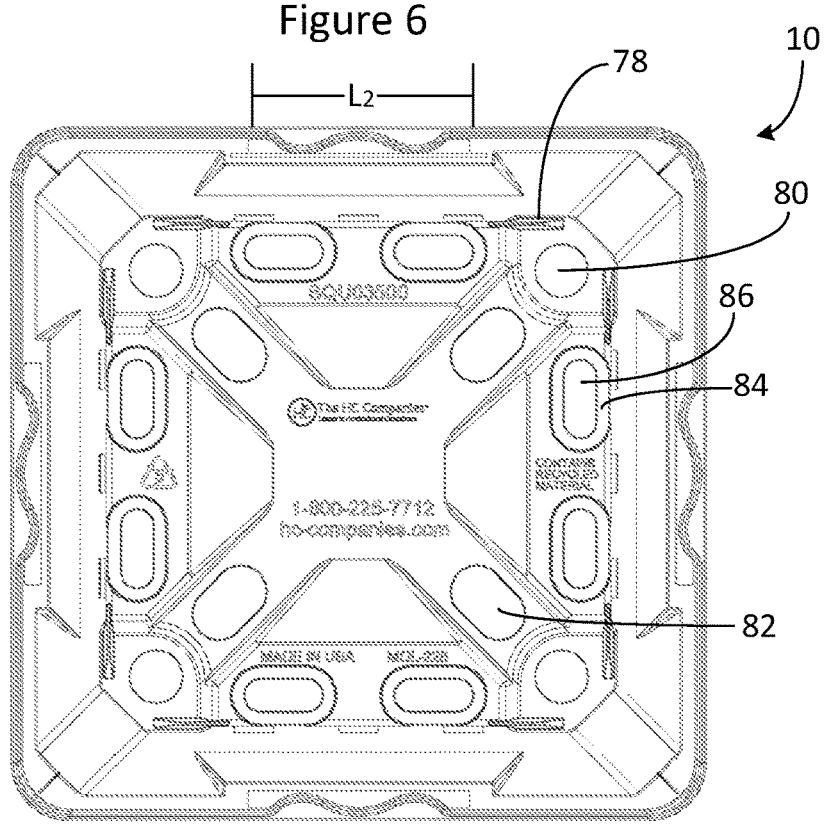
FIG. 7 is a bottom view of the horticultural container with tag.

As shown in FIG. 6, each slot 28 has a ledge 50 extending from each side wall 44 to be contacted by a shoulder 64 of the tag 30 to serve as a stop to prevent downward movement of the tag. As illustrated, the ledges 50 are at the bottom of the each slot 28 reducing a length of the bottom of the slot 28 relative to the top of the slot 28. As such, each slot 28 has a first length L1 at a top of the slot 28 as shown in FIG. 6 and a second length L2 less than the first length L1 at a bottom of the slot 28 as shown in FIG. 7.

Figure 8:
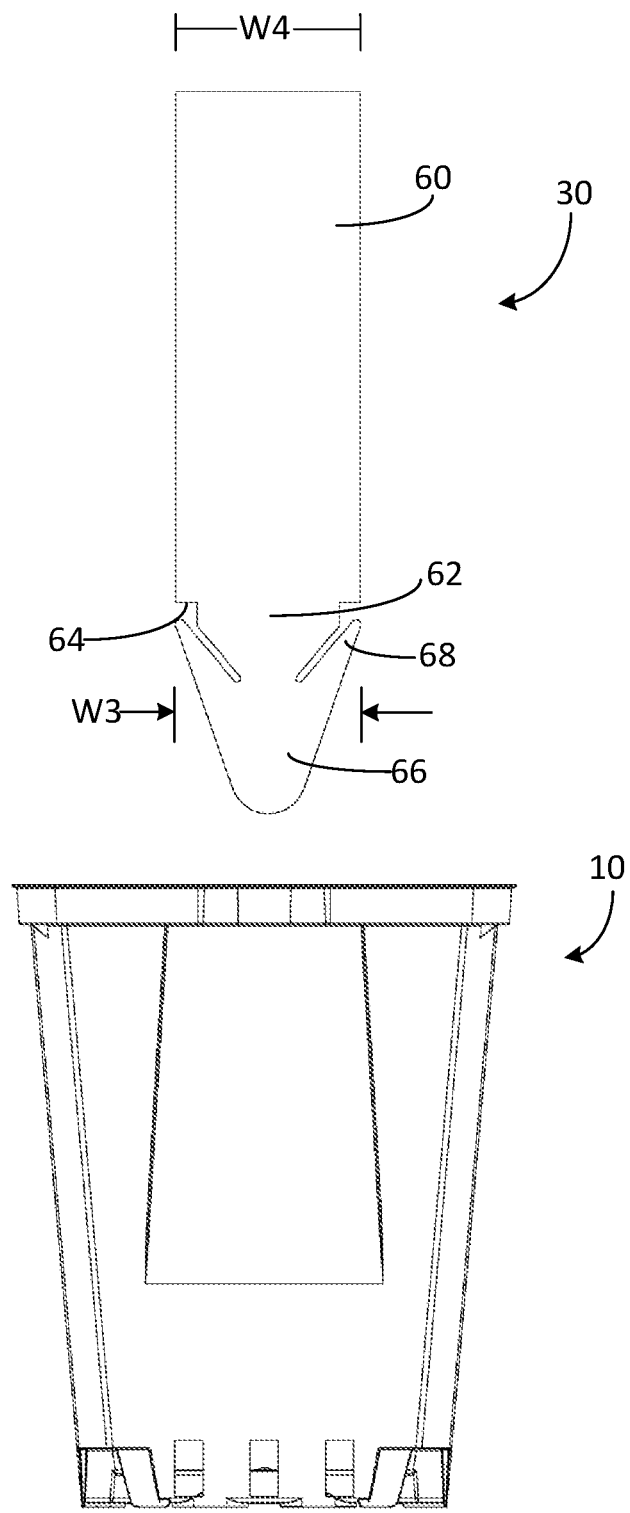
FIG. 8 is a front view of the horticultural container with the tag removed.

Referring now to FIG. 8 and the tag 30 in detail, the tag 30 has a body 60 having shoulders 64, a neck 62 extending from the shoulders 64 on the body 60, and a head 66 extending from the neck 62 and having a pair of ears 68 on opposite sides thereof. The tag 30 is generally planar and the tag slot 28 is configured to change the generally planar geometry of the tag 30 in a manner to reduce potential collapse of the tag 30 when the tag 30 is retained in the tag slot 28. For instance, the tag slot 28 may impart a curve to the tag 30 about a longitudinal axis of the tag 30. The curve makes the tag 30 more stable by reducing a tendency of the upper end of the tag 30 to fall downward toward or away from the inner wall 40.

In one embodiment, a width W3 of the tag 30 at the ears 68 is greater than the length L2 at the bottom of the slot 28 between the ledges 50 and less than the length L1 at the top of the slot 28, and a width W4 of the tag 30 at the body 60 is less than the length L1 at the top of the slot 28. The widths W3 and W4 can be the same or substantially the same, and in an embodiment the width W3 is greater than the width W4. Flexibility of the tag 30 allows for insertion of the head 66 of the tag 30 and the ears 68 all the way through the tag slot 28, and in particular through the area with length L2.

To install the tag 30 in the tag slot 28 in the standing orientation shown, the tag 30 is inserted into the top of the tag slot 28. As the head 66 enters the tag slot 28 at the top of the slot, the peaks 46 align the head 66 in the slot 28. The head 66 is advanced through the slot 28 and the ears 68 flex to fit through the area with the length L2 at the bottom of the slot 28. The tag 28 is then advanced until the ears 68 pass through the bottom of the slot 28 and are proximate the bottom of the ledges 50. The neck 62 has a length that is established such that, after insertion of the head 66 through the tag slot 28, the tag 30 becomes trapped by the ledges 50 such that if a downward force is applied to the tag 30, then the shoulders 64 engage the ledges 50, and if an upward force is applied to the tag 30, the ears 68 contact the bottom of the ledges 50. If sufficient upward force is applied to the tag in an attempt to remove the tag by pulling, then the tag will either fail to be removed or one or both of the ears 68 will shear off the tag. In the latter case, the tag 30 is not reusable in the tag slot of another container as part of an attempt to swap tags between higher and lower priced plants. However, after a consumer has purchased the container 10, the tag 30 may be removed in this manner or may be cut off with a knife or scissors.

Figure 9:
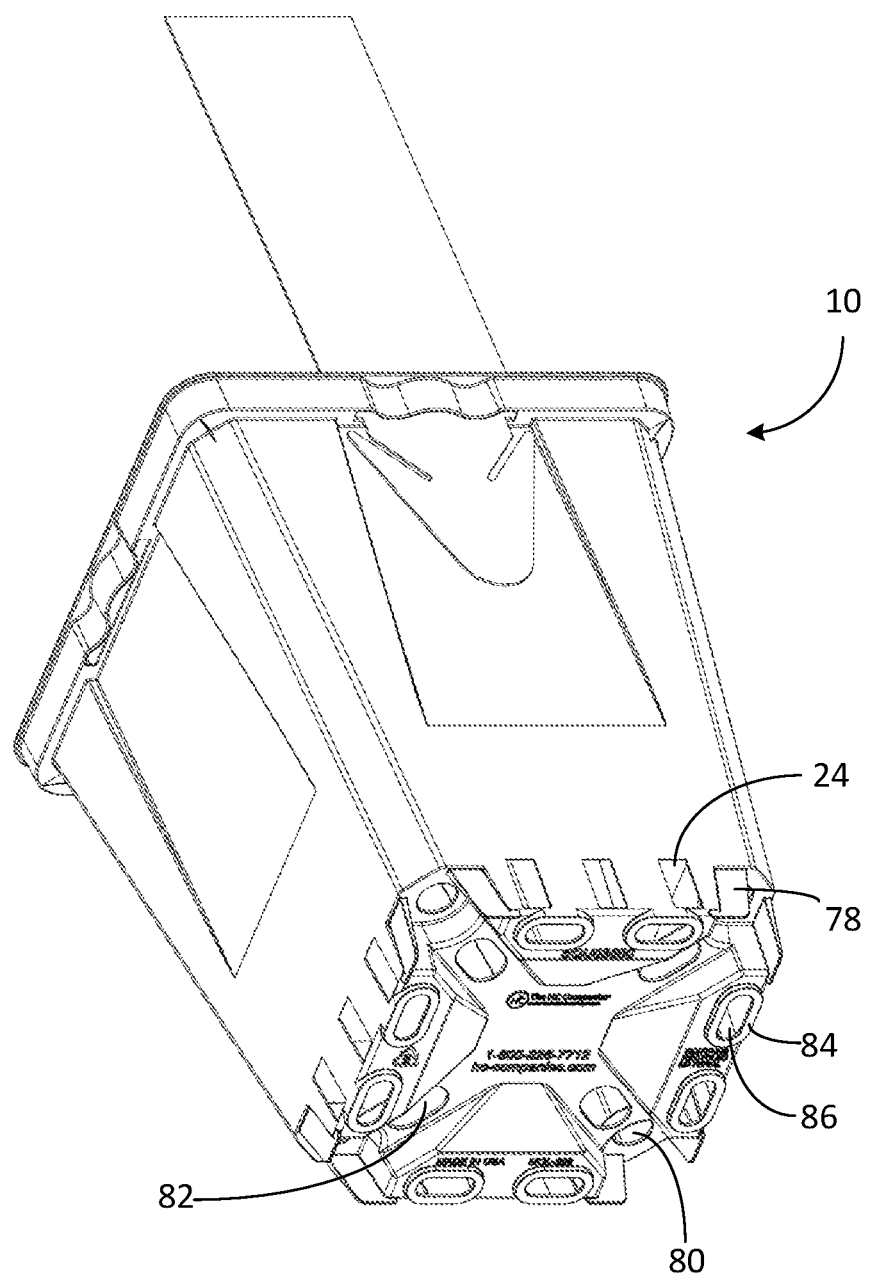
FIG. 9 is a bottom perspective view of the horticultural container with tag.
Figure 10:
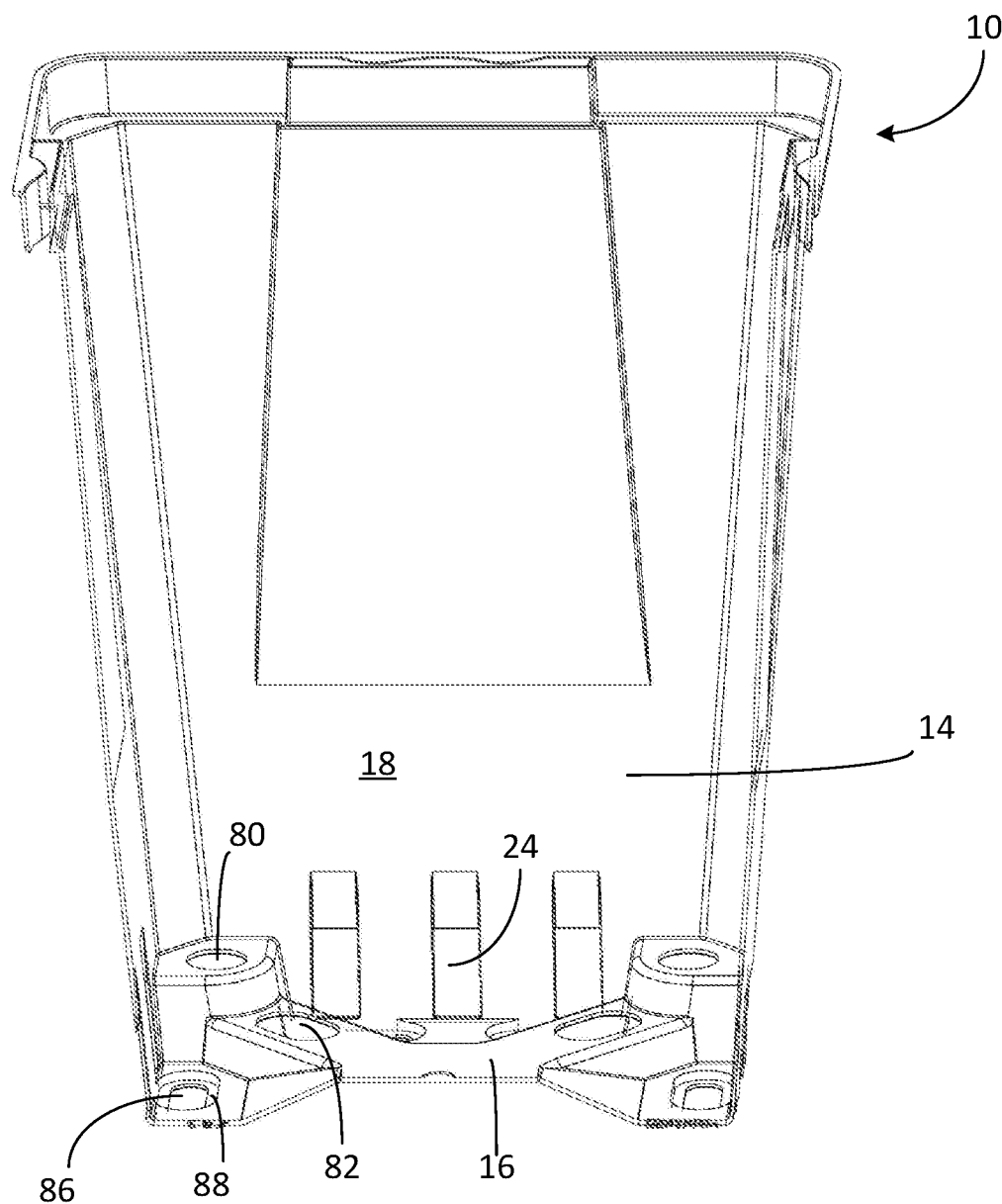
FIG. 10 is a cross-sectional view taken about line 10-10 in FIG. 6.

Referring now to FIGS. 9 and 10, the container 10 includes various opening in the base 16 of the container for drainage in addition to the openings 24 that serve as drainage holes through which excess water may drain in a grow environment to prevent root rot. To assist in air flow underneath the container and assist in preventing root rot, the container 10 can also include legs 78 that space the bottom of the container 10 from a surface the container is resting upon, for example legs provided at corners of the container 10 that extend from the bottom of the walls 14 and/or the base 16.

The various drainage openings in the base 16 may be provided at various heights relative to one another and spaced from the surface. For example, the base 16 can include at least one first drainage opening 80, and in the illustrated embodiment a plurality of first drainage openings 80 in corners of the base 16 a first height from the bottom of the legs 78, and at least one second drainage opening 82, and in the illustrated embodiment a plurality of second drainage openings 82 inwardly spaced from the first drainage openings 80 a second height from the bottom of the legs 78 less than the first height. The openings 24 in the side walls 14 allow for drainage at an elevation higher than the openings 80 and 82, thereby increasing drainage capacity and/or drainage speed, for example during over-watering or when it is raining.

The container 10 can also include openings to allow the container 10 to be used with a water mat on the surface that requires contact with soil to allow for absorption. For example, the container 10 can include at least one projection 84 extending from the base 16, and in the illustrated embodiment a plurality of projections 84 extending from and spaced around the base 16. The projections 84 extend from the base 16 a distance allowing the projections to be flush with the bottom of the legs 78, and therefore to contact the surface the container is resting upon to assist in spacing the bottom of the container from the surface to allow for air flow under the container 10. In an embodiment, the legs 78 may be removed and the projections 84 sever to space the container bottom from the surface.

Each projection 84 defines a mat opening 86 extending therethrough at surface level that allows soil to come in contact with the surface/water mat to wick water up into the chamber 18. The illustrated mat openings 86 are oval shaped, although it will be appreciated that the openings may have any suitable shape, such as circular, rectangular, etc. As best shown in FIG. 10, a space 88 is formed in the chamber 18 by each of the projections 84 allowing the soil in the chamber 18 to nest in the spaces 88 and thereby come in contact with the water mat. The arrangement of openings optimizes drainage and aeration for the plant while allowing the container 10 to be used in a grow environment and/or with a water mat.

The illustrated horticultural container is a square container of the type generally used with transplantable perennials. It will be appreciated that the disclosed features of the illustrated container may be applied to other types of square containers or may be applied to containers having other overall shapes, or that other types of plants may be grown and sold in the illustrated container.

Figure 11:
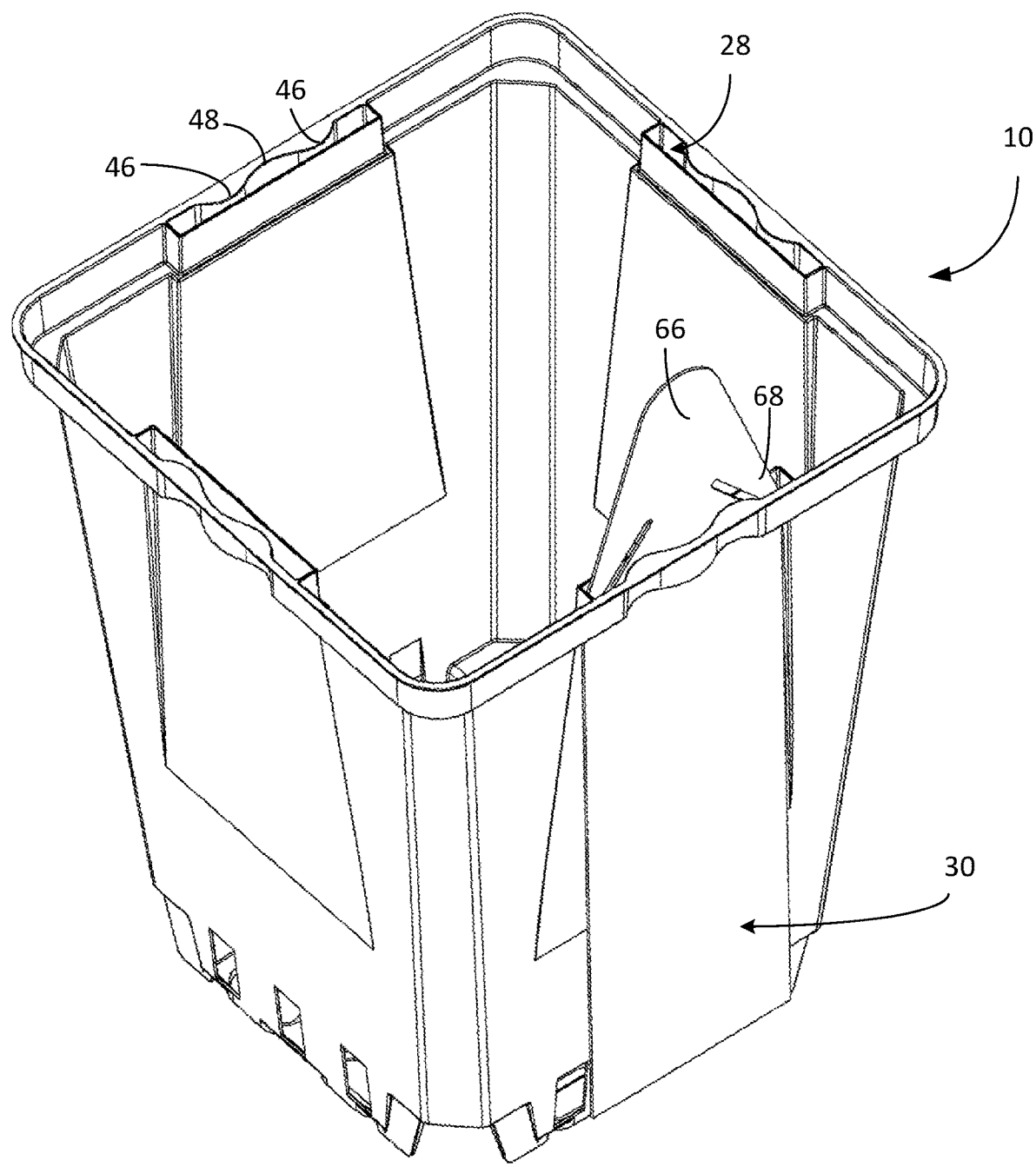
FIG. 11 is a top perspective view of the horticultural container with the tag hanging from the tag slot.
Figure 12:
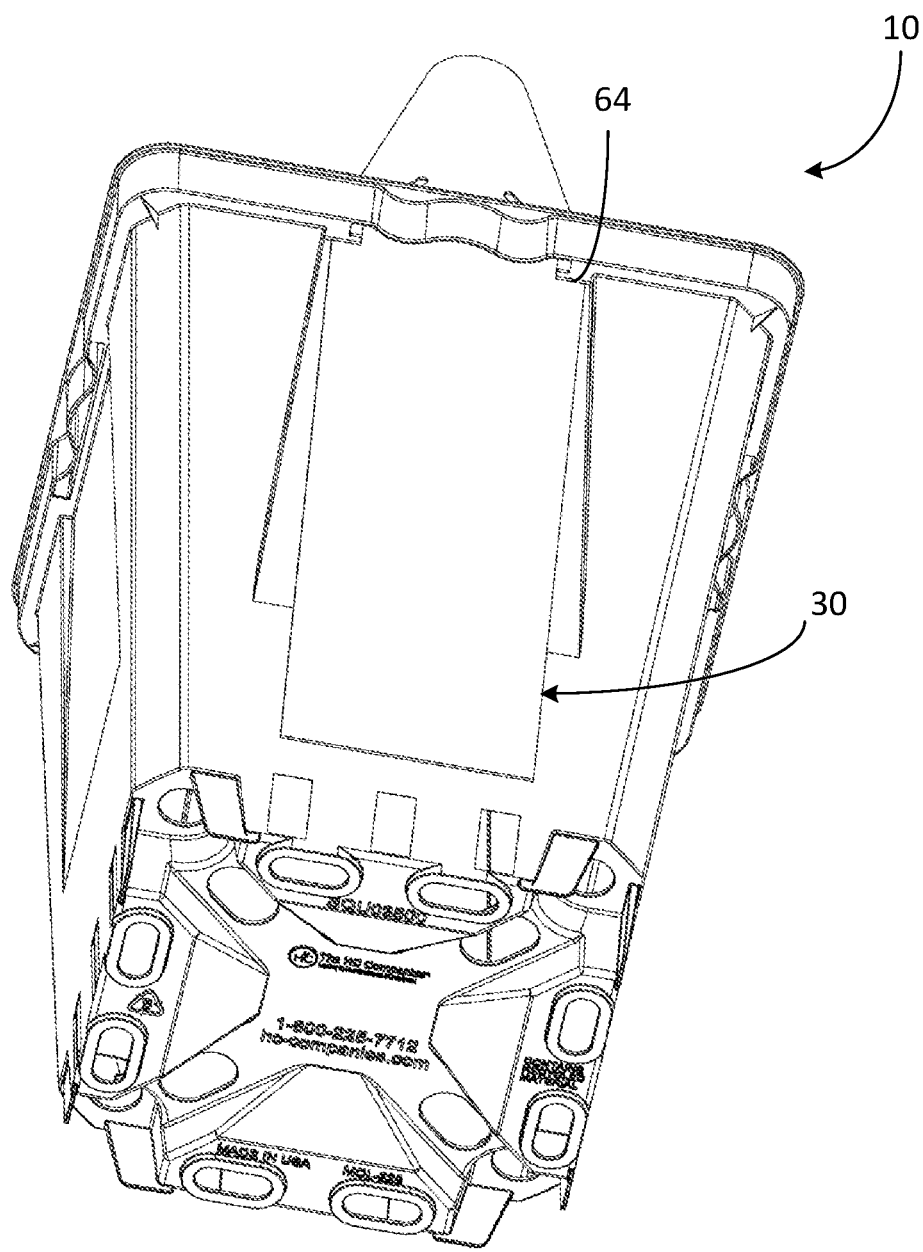
FIG. 12 is bottom perspective view of the horticultural container with the tag hanging from the tag slot.

Turning now to FIGS. 11 and 12, the horticultural container 10 is illustrated with the tag 30 hanging down from the tag slot 28 rather than standing up. To install the tag 30 in the tag slot 28 in this orientation, the tag 30 is inserted from underneath the upper rim 26. As the head 66 enters the tag slot 28 at the bottom of the slot 28 at the area with the length L2, the peaks 46 align the head 66 in the slot 28. The head 66 is advanced through the slot 28 and the ears 68 flex to fit through the area with the length L2 at the bottom of the slot 28. The tag 28 is advanced until the ears 68 pass through the bottom of the slot 28 and are proximate the ledges 50. The neck 62 has a length that is established such that, after insertion of the head 66 through the tag slot 28, the tag 30 becomes trapped by the ledges 50 such that if a downward force is applied to the tag 30, then the ears 68 engage the ledges 50 to prevent removal, and if an upward force is applied to the tag 30, the shoulders 64 contact the bottom of the ledges 50 to prevent removal.

Figure 13:
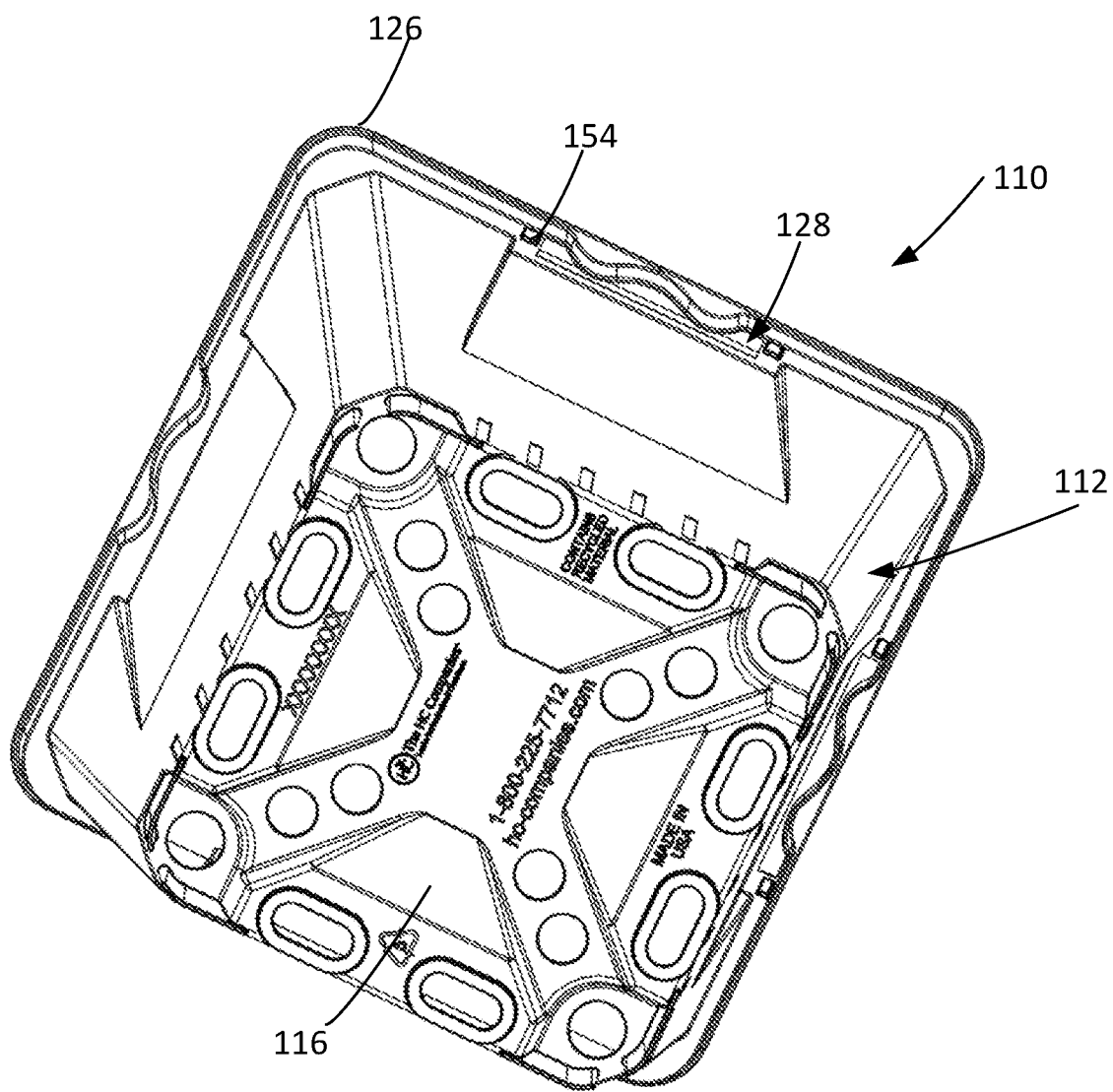
FIG. 13 is a perspective view of another exemplary horticultural container.
Figure 14:
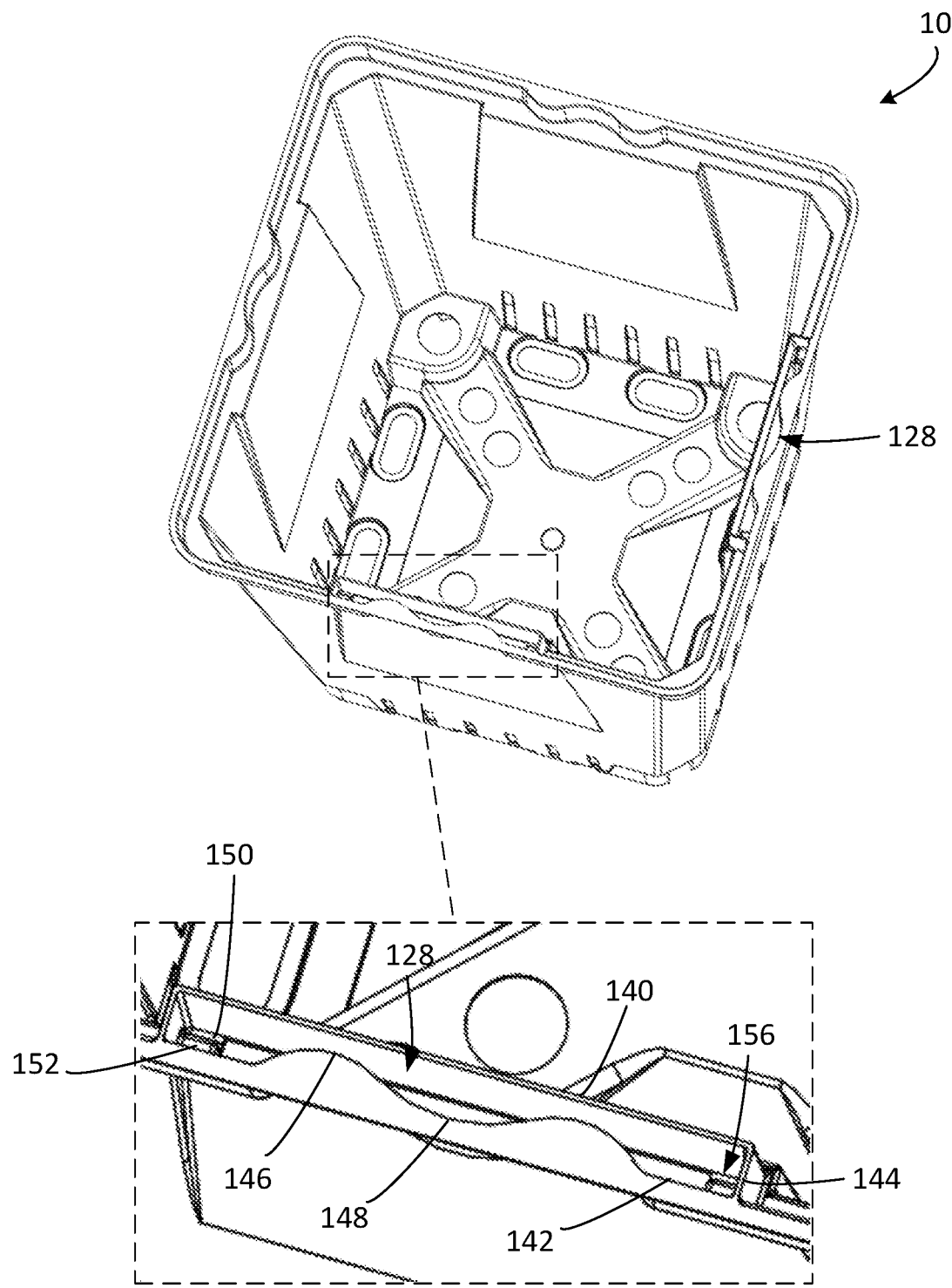
FIG. 14 is another perspective view of the horticultural container.
Figure 15:
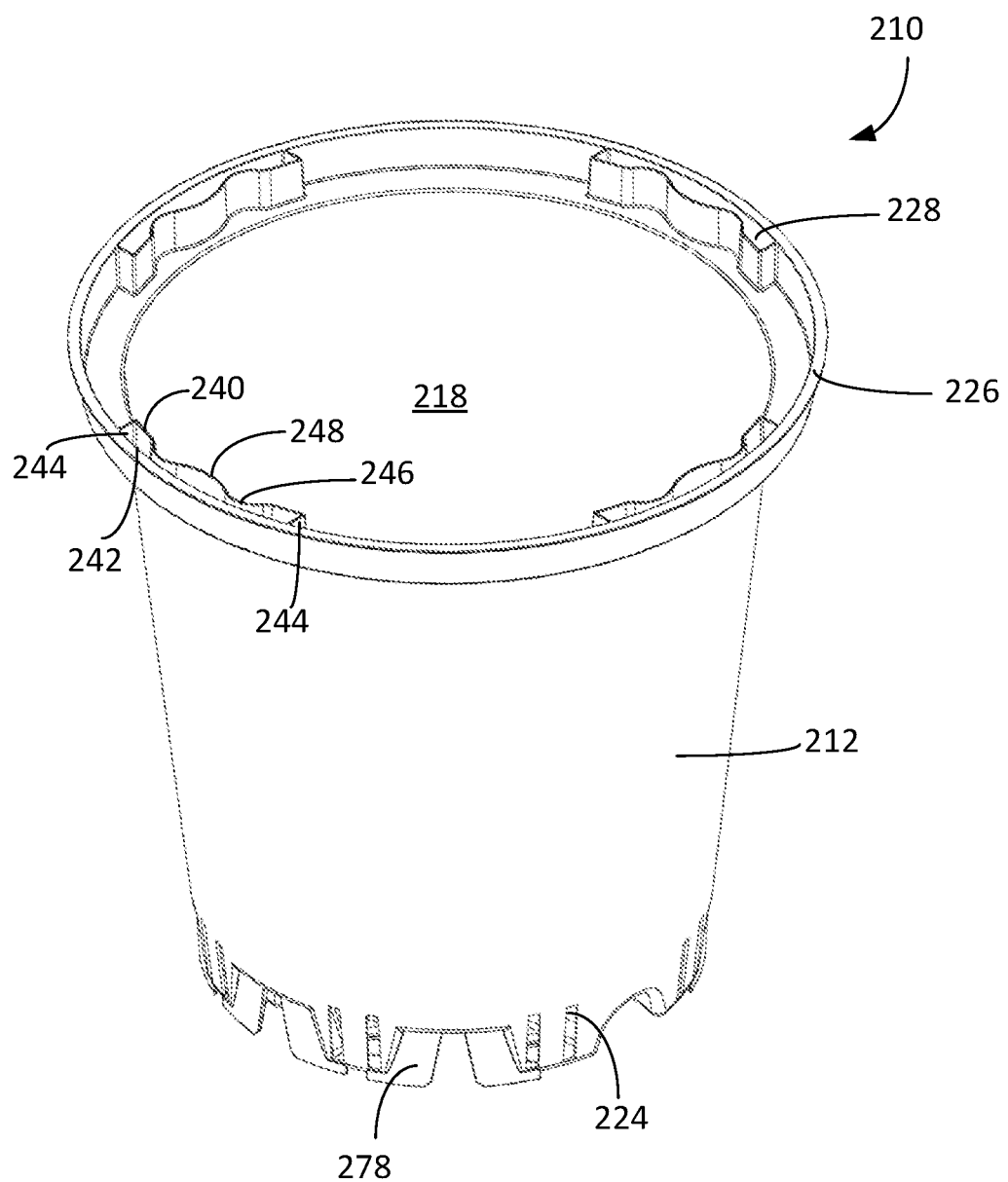
FIG. 15 is a perspective view of still another exemplary horticultural container.
Figure 16:
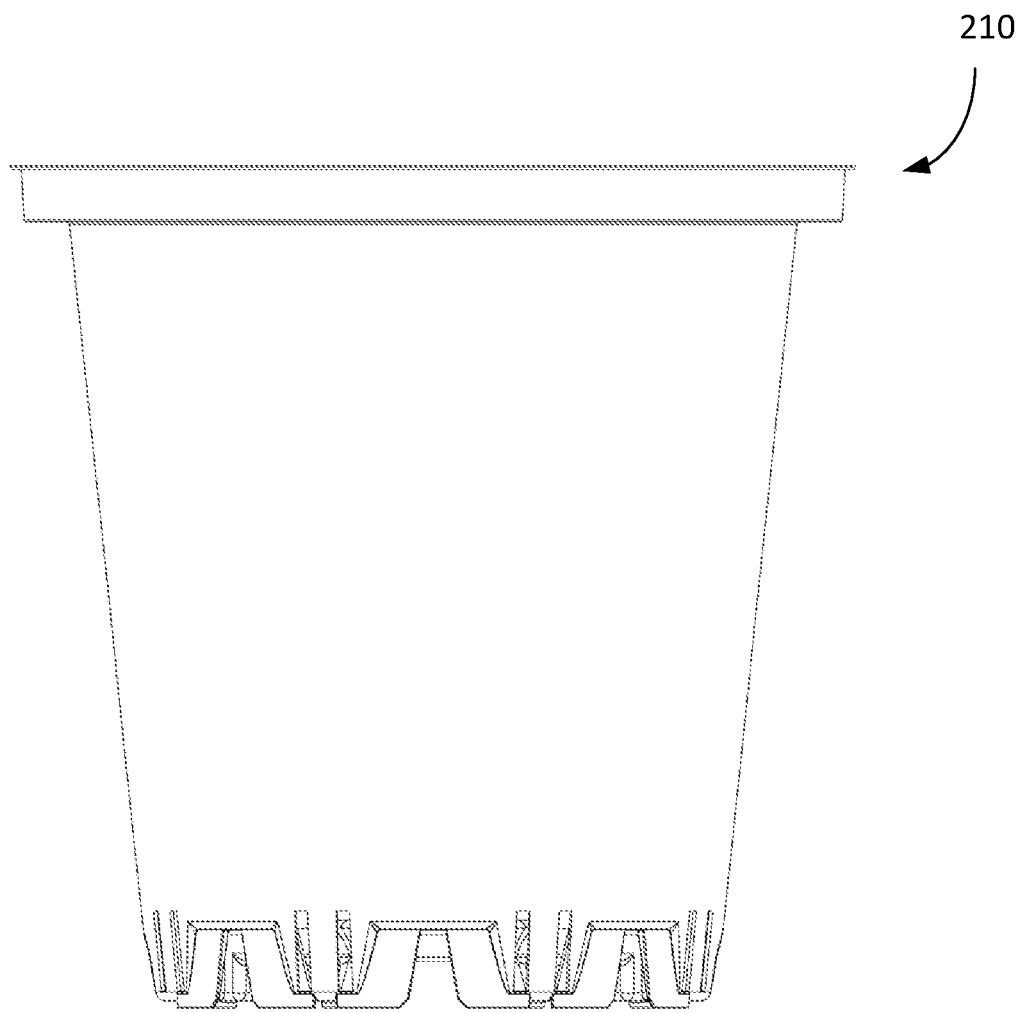
FIG. 16 is a front view of the horticultural container.
Figure 17:
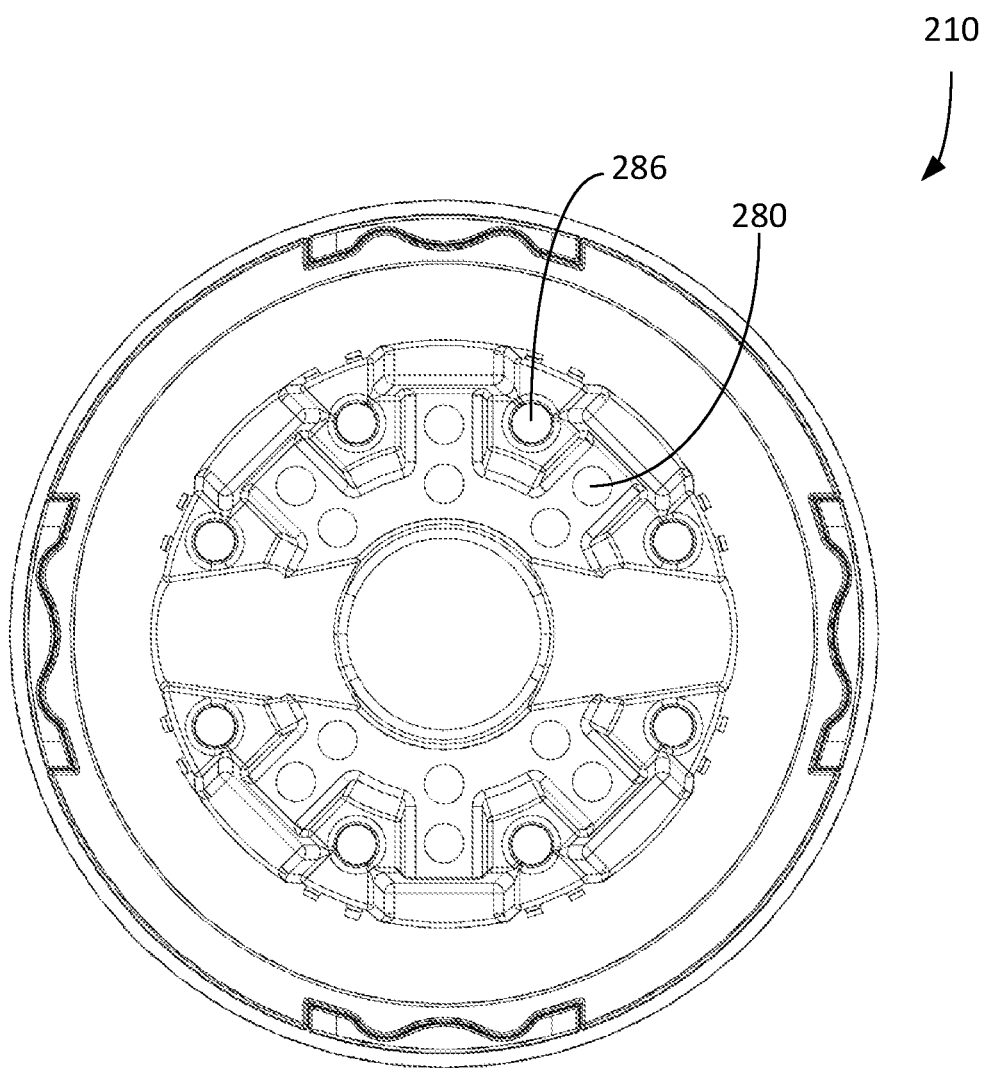
FIG. 17 is a top view of the horticultural container.
Figure 18:
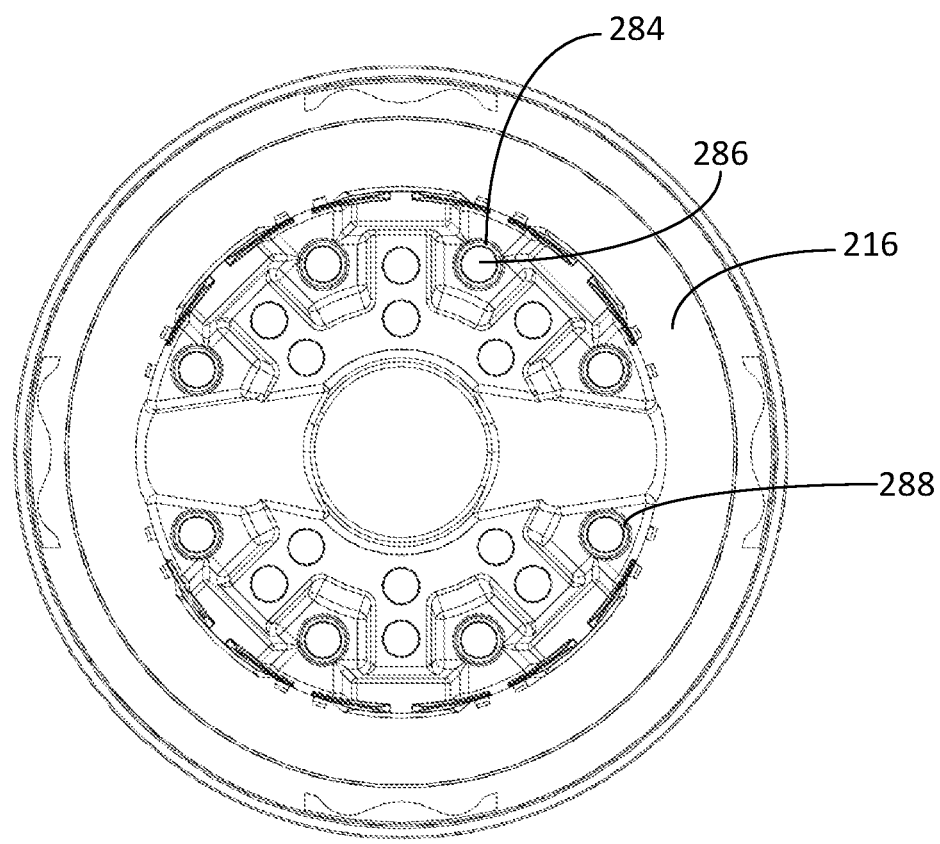
FIG. 18 is a bottom view of the horticultural container.

Turning now to FIGS. 13 and 14, an exemplary embodiment of the horticultural container is shown at 110. The horticultural container 110 is substantially the same as the above-referenced horticultural container 10, and consequently the same reference numerals but indexed by 100 are used to denote structures corresponding to similar structures in the horticultural containers. In addition, the foregoing description of the horticultural container 10 is equally applicable to the horticultural container 110 except as noted below.

The horticultural container 110 includes a body 112 that is illustrated as a container having four sides 114, and a base 116 extending from a bottom of the sides 114. An upper rim 126 extends from a top of the body 112 and includes at least one tag slot 128 extending therethrough for receiving a tag. Each tag slot 128 has an inner wall 140, an outer wall 142, and a pair of side walls 144. One of the inner wall 140 or outer wall 142 has at least two curved peaks 146 separated by a valley 148.

Each slot 128 has a ledge 150 extending from each side wall 144 at the bottom of the each slot 128 reducing a length of the bottom of the slot. Adjacent each ledge 150 is a projection 152 extending from each side wall 144 into the slot. The projections 152 define respective cavities 154 at an underside of the rim 126 and define with the ledges 150 respective pockets 156 for the tag. If the tag is standing up as shown in FIG. 1, the shoulders of the tag would contact the ledges 150 and sit in the pockets 156 providing for additional movement restriction of the tag, and the ears of the tag could at least partially enter the cavities 154. If the tag is hanging down as shown in FIG. 11, the ears of the tag would contact the ledges 150 and sit in the pockets 156.

Turning now to FIGS. 15-19, an exemplary embodiment of the horticultural container is shown at 210. The horticultural container 210 is substantially the same as the above-referenced horticultural container 10, and consequently the same reference numerals but indexed by 200 are used to denote structures corresponding to similar structures in the horticultural containers. In addition, the foregoing description of the horticultural container 10 is equally applicable to the horticultural container 210 except as noted below.

The horticultural container 210 includes a body 212 that may be conical, and a base 216 extending from a bottom of the body 212 to form a closed end of a chamber 218. The body 212 includes a plurality of circumferentially spaced openings 224 at a bottom thereof proximate the base 216. An upper rim 226 extends from a top of the body 212 and includes at least one tag slot 228 extending therethrough for receiving a tag, and in the illustrated embodiment four tag slots. The tag slots 228 include elongate slit-like features that form through passages in the upper rim 226 and that extend in a circumferential direction of the container 210. Each tag slot has an inner wall 240, an outer wall 242, and a pair of side walls 244. One of the inner wall 240 or outer wall 242, and in the illustrated embodiment the inner wall 240, has at least two curved peaks 246 separated by a valley 248

Figure 19:
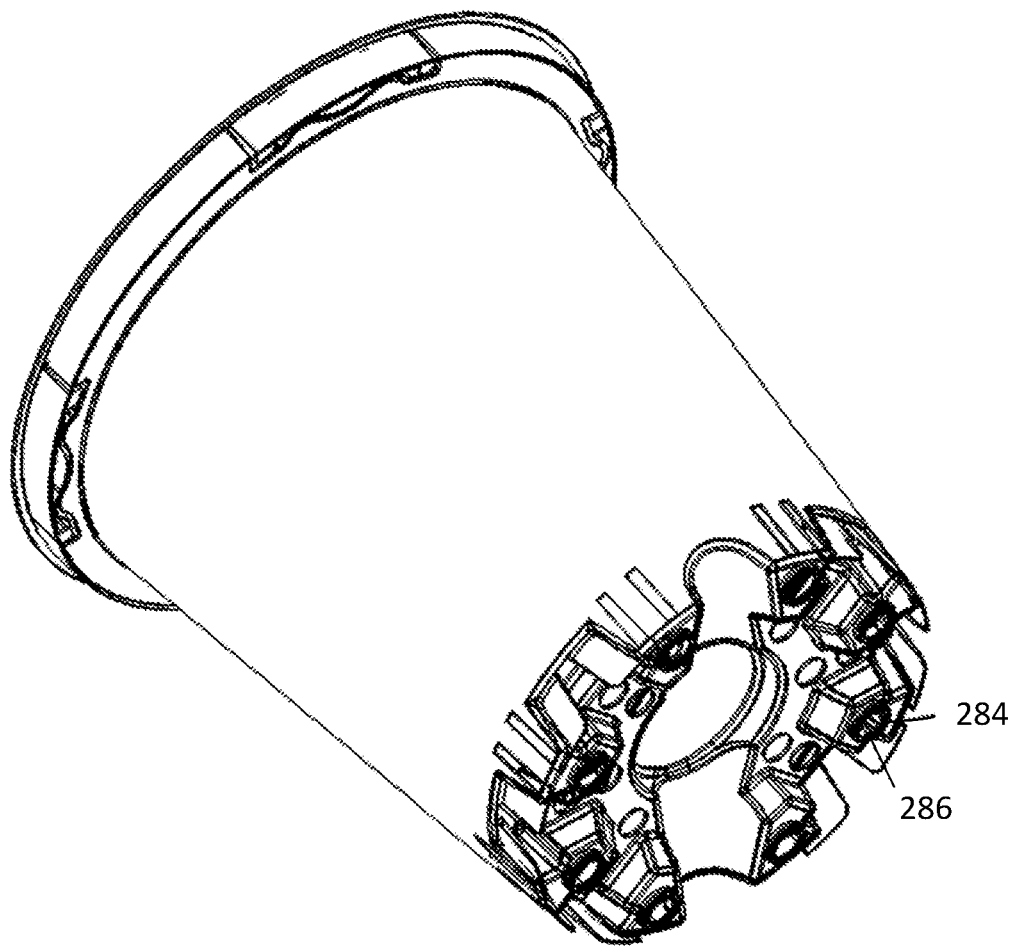
FIG. 19 is another perspective view of the horticultural container.

As shown in FIG. 19, the container 210 includes various opening in the bottom wall of the container in addition to the openings 224 that serve as drainage holes. Legs 278 can be provided that space the bottom of the container 210 from a surface the container is resting upon. The container 210 includes at least one drainage opening 280, and in the illustrated embodiment a plurality of drainage openings 280 spaced around the container and at a height above the bottom of the container that allows for drainage. The openings 224 allow for drainage at an elevation higher than the openings 280.

The container 210 can also include openings to allow the container 210 to be used with a water mat. The container 210 includes at least one projection 284 extending from the base 216, and in the illustrated embodiment a plurality of projections 284 extending from and spaced around the base 216. The projections 284 extend from the base 216 a distance allowing the projections to be flush with legs 278, although it will be appreciated that the legs 278 may be optional.

Each projection 284 defines a mat opening 286 at surface level that allows soil to come in contact with the water mat to wick water up into the chamber 218. The illustrated openings 286 are circular shaped, although it will be appreciated that the openings may have any suitable shape. Spaces are formed in the chamber 218 by the projections 284 allowing the soil to nest in the spaces 288 and come in contact with the water mat.

Although certain embodiments have been shown and described, it is understood that equivalents and modifications falling within the scope of the appended claims will occur to others who are skilled in the art upon the reading and understanding of this specification.

What is claimed is:

1. A horticultural container comprising:
   a body defining a chamber;
   a base extending from a bottom of the body to form with the body a closed end of the chamber; and
   an upper rim extending from a top of the body, the upper rim having a tag slot defining a through passage for receiving a tag,
   wherein the tag slot has an inner wall and an outer wall spaced widthwise from one another,
   wherein one of the inner or outer walls has at least two curved peaks separated by a valley and extending into the slot towards the other of the inner or outer wall to hold the tag therebetween, and
   wherein the body has a sidewall with a recessed portion that is recessed inward adjacent the tag slot out of a plane of the sidewall.

2. The horticultural container according to claim 1, wherein the tag slot includes a pair of ledges configured to be contacted by the tag to prevent downward movement of the tag once installed.

3. The horticultural container according to claim 2, wherein the ledges extend from side walls of the slot such that a length of the slot at a top of the slot is greater than a length of the slot at a bottom of the slot.

4. The horticultural container according to claim 3, wherein adjacent each ledge is a projection extending from each side wall, and wherein the projections define respective cavities at an underside of the upper rim and define with the respective ledge respective pockets for the tag.

5. The horticultural container according to claim 1, wherein the base includes at least one projection extending downwardly from the base to contact a surface upon which the container is configured to rest and defining a first opening to allow soil in the chamber to contact the surface for wicking through the first opening, and at least one second opening spaced above the first opening to allow for drainage from the chamber.

6. The horticultural container according to claim 5, wherein the body includes at least one third opening at a bottom of the body proximate the base, and wherein the at least one third opening is spaced above the at least one second opening to allow for drainage at an elevation higher than the at least one second opening.

7. The horticultural container according to claim 6, wherein the at least one third opening includes a plurality of vertical slots spaced around the body and at the same elevation as one another.

8. The horticultural container according to claim 6, wherein the base includes at least one fourth opening spaced above the at least one second opening and below the at least one third opening.

9. The horticultural container according to claim 5, further including a plurality of legs configured to contact the surface and space the base from the surface to allow air flow under the container, wherein the plurality of legs are flush with the at least one projection.

10. The horticultural container according to claim 1, wherein the tag slot has a first length at a top of the tag slot and a second length at the bottom of the tag slot that is less than the first length.

11. The horticultural container according to claim 10 in combination with the tag that has a body, a neck extending from shoulders on the body, and a head extending from the neck and having a pair of ears on opposite sides thereof, wherein a width of the tag at the ears is greater than the second length of the taq slot and a width of the tag at the body is less than the first length of the taq slot.

12. The horticultural container according to claim 11, wherein when the tag is installed in a standing position, the shoulders of the tag are disposed in the tag slot proximate a top of the ledges and the ears of the tag are disposed outside the tag slot proximate a bottom of the ledges, and when the tag is installed in a hanging position, the ears of the tag are disposed in the tag slot proximate the top of the ledges and the shoulders of the tag are disposed outside the tag slot proximate the bottom of the ledges.

13. A horticultural container comprising:
a body defining a chamber;
a base extending from a bottom of the body to form with the body a closed end of the chamber; and
an upper rim extending from a top of the body, the upper rim having a tag slot defining a through passage for receiving a tag,
wherein the tag slot has an inner wall and an outer wall spaced widthwise from one another,
wherein one of the inner or outer walls has at least two curved peaks separated by a valley and extending into the slot towards the other of the inner or outer wall to hold the tag therebetween, and
wherein the body includes four sides, and where each side has a planar portion and a recessed portion that is recessed inward out of a plane of the planar portion.

14. The horticultural container according to claim 13, wherein the tag slot includes a pair of ledges configured to be contacted by the tag to prevent downward movement of the tag once installed.

15. The horticultural container according to claim 14, wherein the ledges extend from side walls of the slot such that a length of the slot at a top of the slot is greater than a length of the slot at a bottom of the slot.

16. The horticultural container according to claim 15, wherein adjacent each ledge is a projection extending from each side wall, and wherein the projections define respective cavities at an underside of the upper rim and define with the respective ledge respective pockets for the tag.

17. The horticultural container according to claim 13, wherein the base includes at least one projection extending downwardly from the base to contact a surface upon which the container is configured to rest and defining a first opening to allow soil in the chamber to contact the surface for wicking through the first opening, and at least one second opening spaced above the first opening to allow for drainage from the chamber.

18. The horticultural container according to claim 17, wherein the body includes at least one third opening at a bottom of the body proximate the base, and wherein the at least one third opening is spaced above the at least one second opening to allow for drainage at an elevation higher than the at least one second opening.

19. A horticultural container comprising:
a body having four sides and defining a chamber;
a base extending from a bottom of the body to form with the body a closed end of the chamber; and
an upper rim extending from a top of the body, the upper rim having a tag slot extending therethrough for receiving a tag,
wherein the tag slot has an inner wall and an outer wall spaced widthwise from one another,
wherein one of the inner or outer walls has a curved portion extending into the slot towards the other of the inner or outer wall creating an area between the inner and outer walls having a reduced width from another area between the inner and outer walls, and
wherein each side of the body has a planar portion and a recessed portion that is recessed inward out of a plane of the planar portion.

20. The horticultural container according to claim 19, wherein the curved portion includes first and second curved portions spaced lengthwise from one another.

* * * * *